3,080,350
PREPARATION OF POLYVINYL ALCOHOL
Kiyokazu Imai, Kurashiki City, Unpei Maeda, Sozya City, and Masakazu Matsumoto, Kurashiki City, Japan, assignors to Kurashiki Rayon Co., Ltd., Okayama Prefecture, Japan, a corporation of Japan
No Drawing. Filed July 15, 1959, Ser. No. 827,162
11 Claims. (Cl. 260—89.1)

This invention relates to a method of producing polyvinyl alcohol by polymerizing vinyl esters to give polyvinyl esters which are then converted to polyvinyl alcohol. It relates especially to a method in which an organic sulfoxide is used as the reaction medium.

Various procedures are known in the art for polymerizing vinyl esters in the presence of catalyst to give polyvinyl esters, which are then converted to polyvinyl alcohol. Aqueous solutions of the polyvinyl alcohol obtained by these conventional procedures, however, are known to be unstable, gradually increasing in viscosity until the solution is gelatinized. This is a disadvantage when polyvinyl alcohol is used for purposes such as a paste or an adhesive material. Various modifications have been employed to overcome this defect, for example, methods which use a co-polymer or a partially saponified ester.

Numerous techniques have been developed for forming polyvinyl alcohol from polyvinyl esters. A method commonly employed involves alcoholysis with an alcohol such as methanol or ethanol using a strong base or acid as catalyst. When a reaction medium is employed in which the polyvinyl alcohol formed is insoluble, for example an alcohol medium, the polyvinyl alcohol precipitates during the course of the reaction with the result that the precipitated polyvinyl alcohol is not uniform. The polyvinyl alcohol thus produced usually contains residual acetyl groups in amount of about 0.1 mole percent. Moreover, when it is desired to obtain a partially acetylated polyvinyl alcohol, the degree of hydrolysis of the precipitate depositing at an earlier period differs from the degree of hydrolysis of the precipitate depositing at a later period so that there is a lack of uniformity of the product formed throughout the process. Also the transparency of the aqueous solutions of the polyvinyl alcohol thus obtained is not good.

We have discovered that the nature of the reaction medium has an important influence on the polymerization process, and especially on the properties of the polyvinyl alcohol which is formed from the resulting polymerized vinyl ester. We have found that the polyvinyl alcohol which has been formed from a polyvinyl ester which was polymerized using an organic sulfoxide as the reaction medium will be stable and will not gelatinize on standing. Another advantage is that the polyvinyl alcohol so obtained will have a high degree of polymerization. This is true even when an excess of solvent is used. For example, if 30 parts of vinyl acetate are polymerized in 70 parts of dimethyl sulfoxide to a conversion of 70%, the polymer obtained will give on hydrolysis a polyvinyl alcohol having a degree of polymerization of the order of 2000.

We have also discovered that the nature of the reaction medium has an important influence on the conversion of polyvinyl esters to polyvinyl alcohol and on the polyvinyl alcohol formed thereby. We have found that when the polyvinyl acetate is reacted in an organic sulfoxide, which is a solvent for the polyvinyl alcohol to be produced, the reaction proceeds uniformly and the polyvinyl alcohol thus produced contains residual acetyl groups in amount of less than 0.02 mole percent.

An object of the invention is to provide an improved process for the production of polyvinyl alcohol.

Another object of the invention is to provide a reaction medium for the polymerization of vinyl esters to polyvinyl esters which can be converted to polyvinyl alcohol having improved properties.

Still another object of the invention is to provide a reaction medium for the conversion of polyvinyl esters to polyvinyl alcohol wherein the conversion will proceed uniformly and polyvinyl alcohol having improved properties will be obtained.

Other objects will be apparent from a consideration of the specification and claims.

In accordance with the present invention a vinyl ester is polymerized in the presence of a catalyst in a reaction medium of a solvent organic sulfoxide. Using this solvent the polymerization may be conducted in a simple, economic, efficient and non-hazardous manner. The polyvinyl ester thus obtained is converted to polyvinyl alcohol having a high degree of polymerization which will be stable and which will not gelatinize on standing for long periods of time.

The present invention is applicable to the polymerization of vinyl esters which are soluble in the organic sulfoxide reaction medium. Thus the method is applicable not only to the commonly used vinyl acetate, but also to other esters of vinyl alcohol, so as to provide on hydrolysis of the ester a polyvinyl alcohol having equally good physical properties. Suitable esters are those represented by the formula $CH_2=CHOCOR$ in which R is a hydrocarbon radical which may be either alkyl or aryl. An advantage of the use of the organic sulfoxides in the polymerization is that they readily dissolve esters of polyvinyl alcohol and organic acids which contain the aryl group and which are insoluble in the solvents such as methanol and ethanol customarily used as a reaction medium for carrying out the polymerization.

The organic liquid sulfoxides which have been found suitable as the medium for conducting the polymerization are those sulfoxides which are liquid at reaction temperatures and contain no functional or reactive groups. The preferred liquid organic sulfoxides may be designated by the formula $$R-\underset{\underset{O}{\|}}{S}-R'$$

wherein R and R' may be the same or different hydrocarbon radicals, or may represent methylene groups which are bonded together to form a ring structure, as in tetramethylene sulfoxide. Suitable organic liquid sulfoxides include dimethyl sulfoxide, dethyl sulfoxide, methyl ethyl sulfoxide, tetramethylene sulfoxide and the like. It is preferred to use a sulfoxide having a shorter carbon chain since the degree of polymerization of the resulting polymer decreases as the number of carbon atoms in the alkyl group increases.

The liquid organic sulfoxide reaction medium can be recovered by distillation and recycled. There is essentially no loss of organic sulfoxide due to decomposition. The liquid organic sulfoxide may contain small amounts of water, e.g. less than 1%, although the presence of too much water might tend to produce undesirable side reactions.

Generally the vinyl ester is polymerized by heating in a solution of the organic sulfoxide to which an appropriate amount of a polymerization catalyst has been added. The reaction temperature can vary widely and will depend upon a variety of factors including the specific reactants employed, the particular liquid organic sulfoxide used, and the degree of polymerization desired. It is an advantage of this invention that, since the boiling point of the organic sulfoxide is high and the vapor pressure of polymers containing a large quantity of this solvent is low, polymerization can be carried out at a relatively high temperature.

Pressure does not appear to be a parameter of this reaction, and the reaction, therefore, is preferably conducted at atmospheric pressure, although elevated pressures may be used to obtain slight improvements in conversions.

The resulting polyvinyl ester may be recovered and converted to polyvinyl alcohol according to conventional procedures. The method by which the polyvinyl ester is recovered will depend primarily upon the physical nature of the reaction mixture. However, it is an advantage of this invention that the polyvinyl ester polymer need not be recovered from the solution of organic sulfoxide before conversion to the polyvinyl alcohol. Any unreacted monomer may be removed by stripping from the solution by distillation with the aid of a stripping agent, such as nitrogen or methanol, leaving the polymer in the solvent. This solution can be directly subjected to the hydrolysis reaction.

According to the present invention, reaction of the polyvinyl esters to form polyvinyl alcohol can be carried out in a reaction medium containing an organic sulfoxide. An advantage of the organic sulfoxide solvents is that they will readily dissolve polyvinyl alcohol esters of organic acids containing the aryl group, such as methanol and ethanol that are customarily used as a reaction medium for the saponification. Hydrolysis of these polyvinyl alcohol esters will give polyvinyl alcohol having equally good properties as the polyvinyl alcohol obtained from polyvinyl acetate.

The reaction temperature will depend upon a variety of factors including the specific reactants employed and the particular liquid organic sulfoxide used. Generally, the hydrolysis is conducted at a temperature of about 50° to 60° C.

The polyvinyl alcohol is recovered in substantially quantitative amount from the reaction mixture by precipitation with a solvent such as acetone.

The hydrolysis of polyvinyl ester can be carried out by direct saponification with one equivalent of alkali for each equivalent of ester. The acid formed in the reaction reacts irreversibly with the catalyst to form a salt and water. This illustrated by the following formula using polyvinyl acetate:

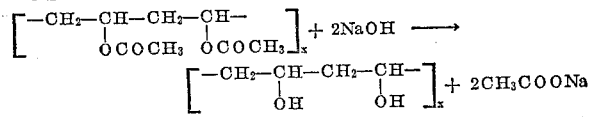

When the polyvinyl ester is saponified using dimethyl sulfoxide as a solvent, the reaction may be somewhat slow since the reaction is limited to direct saponification with the alkali, in which the acid formed reacts irreversibly with the catalyst to form a salt and water, thus consuming the catalyst. However, the hydrolysis reaction can be accelerated by employing a base or acid catalyzed alcoholysis reaction. This is illustrated by the following formula, using polyvinyl acetate and methanol:

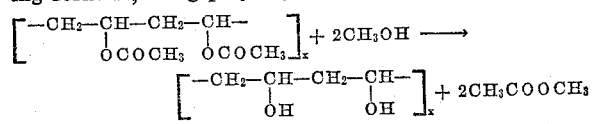

If the quantity of co-existing alcohol is large, gelation occurs at a later stage of the reaction, but the reaction will proceed uniformly by raising the temperature. For example, with one part of polyvinyl acetate, 20 parts of dimethyl sulfoxide and 10 parts of methanol gelation occurs at a later stage of the reaction at 20° C., but the reaction proceeds uniformly at temperatures above 40° C.

In the case of a hydrolysis using dimethyl sulfoxide as a solvent and employing a basic material, acetic acid may be added during the course of the hydrolysis to neutralize the catalyst and stop the reaction at a desired degree of hydrolysis. For example, a polyvinyl alcohol of a 90% degree of hydrolysis was obtained by adding acetic acid during the course of the hydrolysis reaction and plunging the reacted material into a large quantity of methanol. An aqueous solution of a polyvinyl alcohol made in this manner had better transparency, when compared with a partially hydrolyzed product obtained by customary procedure, and a uniform distribution of the degree of hydrolysis.

In an especially preferred practice of the invention both the polymerization and the subsequent hydrolysis are carried out in an organic sulfoxide medium. We prefer to use the same organic sulfoxide since this technique affords the advantages of giving as a product a substantially non-gelling, as well as a fully hydrolyzed polyvinyl alcohol. It will be obvious, however, that conventional polymerization techniques can be combined with the novel hydrolysis method, and that the conventional hydrolysis procedures can be combined with the novel polymerization methods.

The following procedures will serve to further illustrate our invention. All parts are given by weight.

*Example 1*

Thirty parts of vinyl acetate was polymerized in 70 parts of dimethyl sulfoxide at 60° C., using azoisobutyronitrile as catalyst. The polymer obtained was hydrolyzed by a conventional method. A 15% aqueous solution of this polyvinyl alcohol, having a degree of polymerization of 1650, showed no change in viscosity whatsoever after being kept for 100 hours at 30° C. On the other hand, a 15% aqueous solution of polyvinyl alcohol having a degree of polymerization of 1645, obtained by the polymerization of polyvinyl acetate in solution of methanol, was unstable. The viscosity of the solution increased on standing at 30° C. and after 50 hours the solution became gelatinized.

*Example 2*

Thirty parts by vinyl acetate was polymerized by heating with 0.01 part of azoisobutyronitrile in 70 parts of dimethyl sulfoxide in a sealed tube at 60° C. for 40 hours. A 95% yield of polyvinyl acetate having an average degree of polymerization of 2960 was obtained. The resulting polyvinyl acetate was dissolved in methanol and hydrolyzed by base catalyzed alcoholysis by conventional procedures. The polyvinyl alcohol obtained had an average degree of polymerization of about 1700. A 15% aqueous solution of this polyvinyl alcohol was very stable and did not gelatinize after 3 days at 30° C.

*Example 3*

One gram of polyvinyl acetate was dissolved in 20 cc. of dimethyl sulfoxide and to this solution was added 10 cc. of a solution of normal sodium hydroxide in methanol. The mixed solution was kept at 60° C. for one hour and then sufficient acetone was added to precipitate the polyvinyl alcohol completely. The polyvinyl alcohol obtained had only 0.017 mole percent of residual acetyl groups.

*Example 4*

Three-tenths grams of polyvinyl benzoate was dissolved in 20 cc. of dimethyl sulfoxide and to this solution was added 10 cc. of a solution of 0.5 normal sodium hydroxide in methanol. The mixed solution was kept at 50° C. for 2 hours. A large quantity of acetone was then added to precipitate the polyvinyl alcohol. The reaction solution contained 0.08 g. of polyvinyl alcohol. The ultra-violet spectrum of an aqueous solution of the polyvinyl alcohol thus obtained showed that the benzoyl ether group was almost completely absent and the residual benzoate ester group in the polyvinyl alcohol was estimated to be less than 0.2 mole percent.

*Example 5*

Polyvinyl acetate is prepared by the method described in Example 1. The unreacted monomer is stripped from the polymerization reaction mixture. To the resulting solution of polymer in dimethyl sulfoxide is added 520 cc. of dimethyl sulfoxide and 285 cc. of a solution of 1 normal sodium hydroxide in methanol.

The resulting polyvinyl ester solution is alcoholized as described in Example 3. The product polyvinyl alcohol is substantially completely hydrolyzed and exhibits high stability in aqueous solution.

We claim:

1. A process for the preparation of polyvinyl alcohol which comprises homopolymerizing a vinyl ester having the formula $CH_2=CHOCOR''$, wherein $R''$ is a hydrocarbon radical selected from the group consisting of alkyl and aryl radicals, in the presence of a polymerization catalyst in an inert reaction medium consisting essentially of a liquid organic sulfoxide, said liquid organic sulfoxide having the formula

wherein R and R' are selected from the group consisting of hydrocarbon radicals and methylene groups which are bonded together to form a ring structure, and thereafter-hydrolyzing the polymerized vinyl ester in an organic sulfoxide reaction medium, said liquid organic sulfoxide having the formula

wherein R and R' are selected from the group consisting of hydrocarbon radicals and methylene groups which are bonded together to form a ring structure.

2. A polyvinyl alcohol prepared by the method of claim 1.

3. A process according to claim 1 in which the organic sulfoxide is dimethyl sulfoxide in both the polymerization and hydrolysis steps.

4. A process according to claim 1 in which the vinyl ester is vinyl acetate.

5. A process for the preparation of polyvinyl alcohol which comprises homopolymerizing a vinyl ester having the formula $CH_2=CHOCOR''$, wherein $R''$ is a hydrocarbon radical selected from the group consisting of alkyl and aryl radicals, in the presence of a polymerization catalyst in an inert reaction medium consisting essentially of a liquid organic sulfoxide, said liquid organic sulfoxide having the formula

wherein R and R' are selected from the group consisting of hydrocarbon radicals and methylene groups which are bonded together to form a ring structure, and thereafter hydrolyzing the polymerized vinyl ester.

6. A process for the preparation of polyvinyl alcohol which comprises homopolymerizing a vinyl ester having the formula $CH_2=CHOCOR''$, wherein $R''$ is a hydrocarbon radical selected from the group consisting of alkyl and aryl radicals, in the presence of a polymerization catalyst, and thereafter hydrolyzing the polymerized vinyl ester in an organic sulfoxide reaction medium, said liquid organic sulfoxide having the formula

wherein R and R' are selected from the group consisting of hydrocarbon radicals and methylene groups which are bonded together to form a ring structure.

7. A process for the homopolymerization of vinyl esters which comprises contacting a vinyl ester monomer having the formula $CH_2=CHOCOR''$, wherein $R''$ is a hydrocarbon radical selected from the group consisting of alkyl and aryl radicals, with a polymerization catalyst under polymerization conditions in an inert reaction medium consisting essentially of a liquid organic sulfoxide, said liquid organic sulfoxide having the formula

wherein R and R' are selected from the group consisting of hydrocarbon radicals and methylene groups which are bonded together to form a ring structure.

8. A process as defined in claim 1, wherein said first-named liquid organic sulfoxide is the same as said second-named organic sulfoxide.

9. A process as defined in claim 5, wherein said organic sulfoxide is dimethylsulfoxide.

10. A process as defined in claim 6, wherein said organic sulfoxide is dimethylsulfoxide.

11. A process as defined in claim 7, wherein said organic sulfoxide is dimethylsulfoxide.

References Cited in the file of this patent

UNITED STATES PATENTS 2,649,435     Stanin     Aug. 18, 1953